July 12, 1932.  R. SWINNE  1,867,193
KERR CELL
Filed Oct. 25, 1930

INVENTOR
RICHARD SWINNE
ATTORNEY 1,867,193

UNITED STATES PATENT OFFICE

RICHARD SWINNE, OF BERLIN-STEGLITZ, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

KERR CELL

Application filed October 25, 1930, Serial No. 491,185, and in Germany October 25, 1929.

In the operation of Kerr cells for the inertialess control of a ray pencil, for instance, in picture telegraphy, in televisors, in talking-film equipment and similar apparatus, separation or deposition of material manifests itself at one of the electrodes due to the polarizing potential imparted to the cell. This phenomenon is not entirely preventable even when the liquid, such as nitrobenzol, used to fill the cell has been thoroughly purified, and it gradually leads to disturbances in operation. It depends upon the nature of these separations or deposits whether the positive or the negative electrode becomes covered therewith.

According to the present invention the depositions are rendered harmless by temporarily or periodically altering the polarity of the biasing potential upon the cell. If this method is used at shorter time intervals, say, of a few hours, it is possible to avoid the depositions entirely, indeed even to cause such coats as have previously been formed by continuous operation of the cell at a constant polarizing potential at one electrode to disappear.

Figure 1:
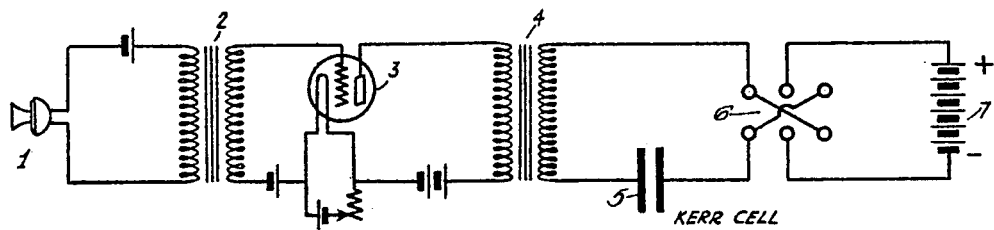
Figure 2:
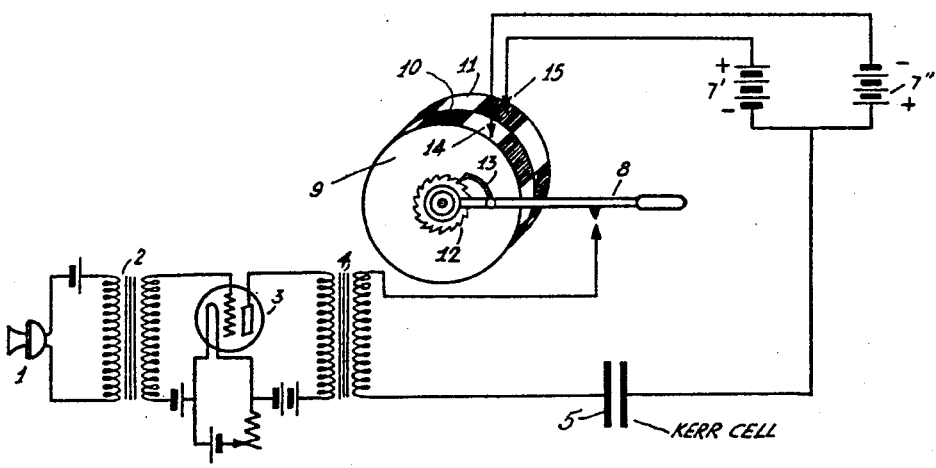

The change in polarity of the biasing potential may be accomplished manually. However, it is more convenient to effect the reversal in a positively acting manner conjointly with some manipulation or circuit change required by routine operation of the attached outfit at certain time intervals. For instance, the change-over switch for the biasing potential of the Kerr cell may be used together with the switch starting the apparatus pertaining to the Kerr cell in such a manner that after the stopping of the equipment the polarity of the biasing potential is reversed each time the switch is closed. As a connecting link between the operating switch and the switch effecting reversal of polarity, there may be used a step wheel moved forward by the operating switch handle, upon the shaft of which a commutator is arranged in such a position that upon each complete preferred forms which my invention may assume, wherein:

Fig. 1 illustrates one manner of connecting the Kerr cell so as to reverse the polarity of the biasing potential by means of a double-pole double-throw switch; and, Fig. 2 shows a modification of the arrangement of Fig. 1 whereby each closure of the circuit to the Kerr cell produces a different biasing potential upon the cell.

Now referring to the drawing, signals originating at any source, such as a microphone 1, or a radio or wire receiver, for example, may be transferred through a transformer 2 to an amplifier 3 from the output of which they may be fed through a transformer 4 to the plates of a Kerr cell 5. The Kerr cell consists of the usual optical systems comprising the usual polarizing and analyzing Nicol prism arranged in front and behind the cell respectively (not shown) as is well known. Any suitable dielectric, such as nitrobenzene, for example, may be used with the cell.

The double-pole double-throw switch 6, so connected that the Kerr cell 5 will be supplied with signal potentials originating in the secondary of the transformer 4, provides a means for changing the biasing potentials originating in the source 7 from positive to negative upon the respective plates of the cell. According to this showing, it will be observed that by throwing the switch from one side to the other at one time a positive biasing potential is applied to the top plate of the cell and the negative to the end plate, and with the switch in the opposite direction, opposite conditions result.

By Fig. 2 I have shown a modification of the invention wherein signals are supplied to an amplifier 3 in the same manner that they were according to the showing of Fig. 1, and fed through a transformer 4 so as to control the light passing through the Kerr cell. According to this modification, incoming signals from one end of the output of the transformer 4 are connected through a switch 8 opposite end of the transformer is connected to the opposite plate of the Kerr cell.

According to the arrangement shown, it will be seen that the switch arm 8, carried upon a shaft which also supports a ratchet wheel 12 with the commutator 9 fixed rigidly to the ratchet wheel 12, will be rotated by means of the pawl 13 engaging with the ratchet wheel 12 each time the switch 8 is open. The commutator 9 is made of conducting material and about the periphery thereof insulating segments 10 have been provided, so that when the brushes 14 and 15 arranged opposite to each other on the commutator bear against the periphery of the commutator, one brush, for example, as shown the brush 14, will rest upon a conducting portion of the commutator 11 and the brush 15 will rest upon an insulating portion of the commutator opposite to the brush 14. Thus, in the position shown the battery 7' is connected in series with the Kerr cell, whereas, upon opening the circuit, the commutator will be rotated in a counter clockwise direction so that upon the next closure of the switch the battery 7'' will be connected in series with the Kerr cell.

It will thus be seen that each time the switch arm 8 is moved so as to close the circuit provision has been made for changing the biasing potential from a positive to a negative, or vice versa, on the cell.

Having now described my invention, what I claim and desire to secure by Letters Patent is the following:

1. A method of operating Kerr cells which comprises supplying signal potentials to the cell, simultaneously supplying biasing potentials to the cell, and upon interruption of the signals supplied to the Kerr cell changing the polarity of the biasing potential supplied thereto.

2. In an electro-optical system, a Kerr cell, means for supplying signal potentials to the cell, means for interrupting the supply of signal potential to the cell, means for supplying a direct current bias to the cell, and means operable at each time of supplying signal potentials to the cell for changing the polarity of the biasing potential supplied to the cell.

3. In an electro-optical system, a Kerr cell, means for supplying signal energy to said Kerr cell, means for connecting and disconnecting the supply of signal energy to said cell, means for supplying biasing potentials to the said cell, and means operative upon each connection and disconnection of the signal potentials for changing the biasing potential upon the respective plates of the cell from positive to negative and vice versa.

In testimony whereof I affix my signature.

RICHARD SWINNE.